United States Patent [19]

Stonehouse

[11] Patent Number: 5,435,689
[45] Date of Patent: Jul. 25, 1995

[54] CONVEYOR FOR PARTICULATE MATERIALS

[76] Inventor: Ross W. Stonehouse, Box 45, Darcy, Saskatchewan, Canada, S0L 0N0

[21] Appl. No.: 76,903

[22] Filed: Jun. 15, 1993

[51] Int. Cl.6 .................................................. B60P 1/36
[52] U.S. Cl. ................................... 414/502; 198/836.3; 414/503; 414/523; 414/537; 414/920
[58] Field of Search ............... 414/502, 503, 523, 528, 414/537, 920; 198/550.2, 550.13, 836.1, 836.3

[56] References Cited

U.S. PATENT DOCUMENTS

| | | | |
|---|---|---|---|
| 1,494,223 | 5/1924 | Dussault | 198/550.2 |
| 1,860,519 | 5/1932 | Wickersham | 198/836.3 |
| 2,415,013 | 1/1947 | Kubitz | 198/550.2 |
| 3,300,068 | 1/1967 | Tarrant | 414/528 |
| 3,939,958 | 2/1976 | Pyles | 414/528 |
| 4,884,937 | 12/1989 | Braunius | 414/528 |
| 5,154,280 | 10/1992 | Mott | 198/836.1 |

*Primary Examiner*—Michael S. Huppert
*Assistant Examiner*—Thomas J. Brahan
*Attorney, Agent, or Firm*—Adrian D. Battison; Stanley G. Ade; Murray E. Thrift

[57] ABSTRACT

A conveyor for particulate material such as grain comprises a conveyor duct with an improved hopper section which has side walls which can fold down flat to allow passage over the hopper section of a vehicle. The conveyor is the type including a belt Which passes through a tube. The belt passes underneath the side walls of the hopper section to carry the material out of the hopper section. The side walls are mounted for pivotal movement about pins at a bottom edge of the side walls and are held in an upwardly and outwardly inclined position by springs. The structure is mounted on a base frame with ramps so that the vehicle can pass over the base frame and flatten the side walls, following which the side walls are pulled upwardly to the hopper position by the springs.

11 Claims, 3 Drawing Sheets

CONVEYOR FOR PARTICULATE MATERIALS

BACKGROUND OF THE INVENTION

This invention relates to a conveyor for particulate materials and particularly of the type including a belt which carries the material from a hopper section into a duct.

Belt conveyors of this type are well known in which there is an initial section of the belt at a hopper portion in which the belt is flat following which the belt is formed into a channel shape to move along a duct often in the form of a conveyor tube.

Such conveyors which are used for farm use often require that a vehicle is backed up to the conveyor section to deposit the particulate material from the vehicle into the hopper section. It is necessary to back the vehicle to the hopper section accurately which is of course difficult action and may involve repeated visual checks of a location of the vehicle relative to the hopper section.

SUMMARY OF THE INVENTION

It is one object of the present invention, therefore, to provide an improved conveyor of this general type in which the vehicle can be driven over the hopper section forwardly.

According to the invention, therefore, there is provided a conveyor for particulate material comprising a conveyor duct, a hopper section and a feed end of the duct, a continuous belt movable longitudinally of the duct and the hopper so as to transport the particulate material deposited in the hopper section into and along the duct, the hopper section having a pair of side walls for confining material on the belt, each side wall being arranged adjacent a respective side edge of the belt, the side walls each being mounted for pivotal movement about a longitudinal axis at a base of the respective side wall such that each side wall can fold flat downwardly to allow passage over the side wall and the hopper section of a vehicle wheel, and means biasing the side walls into a raised position for confining a material on the belt.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
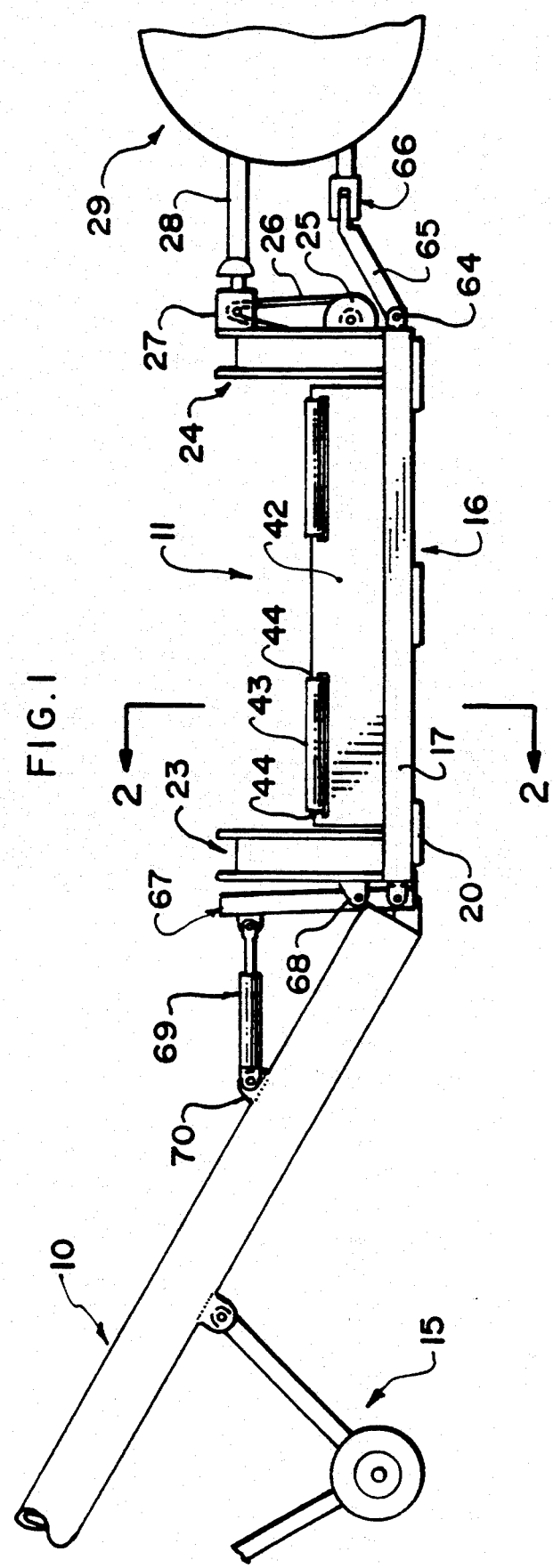
FIG. 1 is a side elevational view of a conveyor according to the present invention.

The conveyor comprises a main conveyor tube 10 and a hopper section 11 for feeding material into the main conveyor tube or duct 10. The actual transportation of the material within the hopper section and through the tube 10 is effected by a belt 12 which is continuous having an upper belt run 13 for carrying the material and a return run 14. Conveyors of this general type are known and it is well known that the belt is confined by guide rollers as it enters the tube so that it curves from the flat horizontal position in the hopper section to a cupped or curved section within the tube for transporting the material longitudinally of the tube.

The main conveyor tube 10 is mounted upon a suitable support frame and wheel assembly 15 upon which it can be transported and on which the angle of a tube can be adjusted by conventional means (not shown).

The hopper section comprises a main longitudinal beam 16 defined by a pair of square tubes 17 and 18 which are parallel and spaced by the width of a connecting plate 19 which is welded between the two tubes. On the underside of the tubes is provided a plurality of pads 20 which rest on the ground and thus support the base in flat position on the ground. On the outside of the tubes is provided a pair of inclined ramp plates 21 which extend from the top of the tube downwardly to the ground to allow a vehicle wheel to roll up the ramp and over the base including rolling over the plate 19. The upper run 13 of the belt is positioned just above the plate 19 so that it slides across the plate. The return run 14 is positioned underneath the plate 19.

Figure 2:
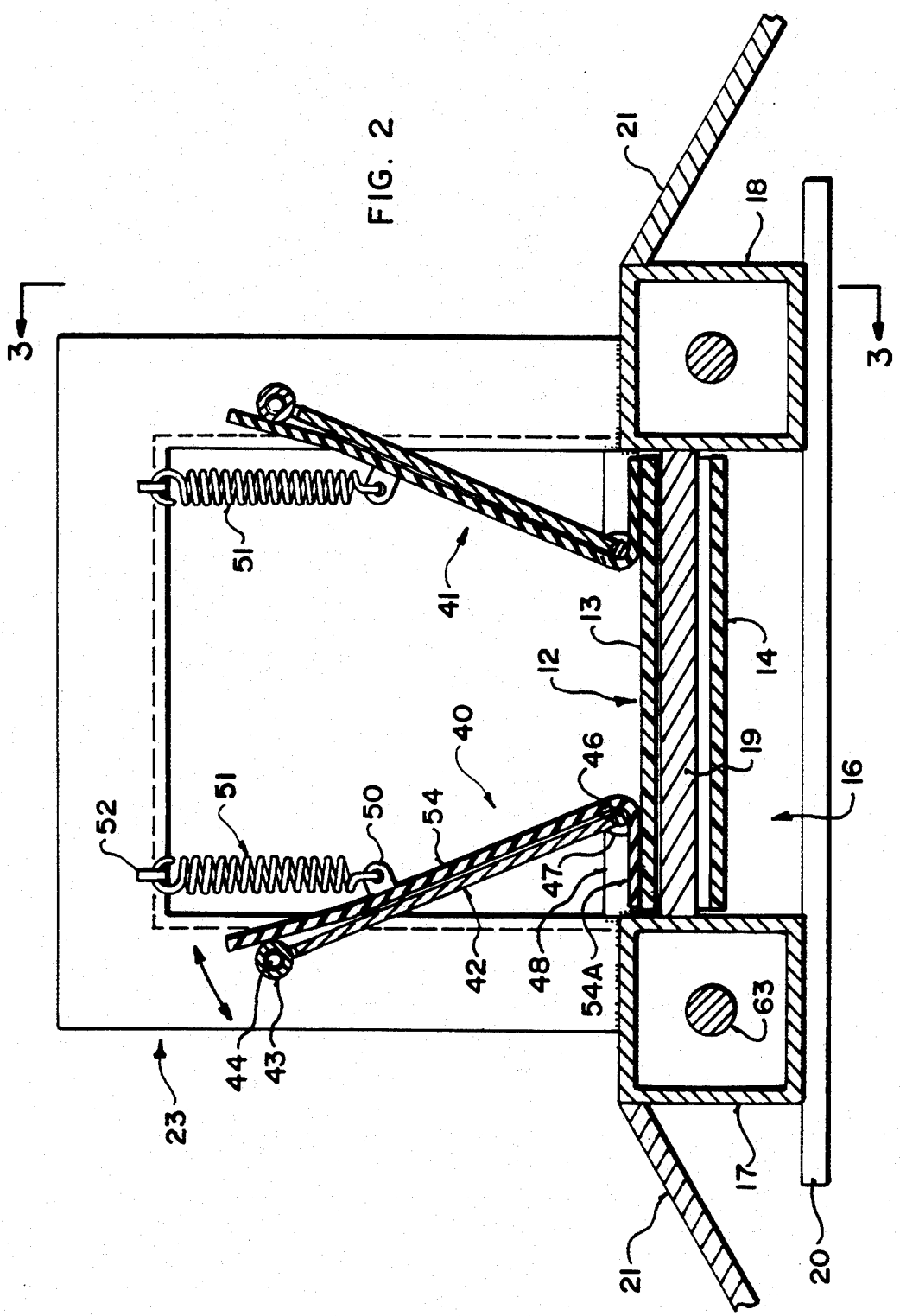
FIG. 2 is a cross sectional view along the lines 2—2 of FIG. 1.
Figure 3:
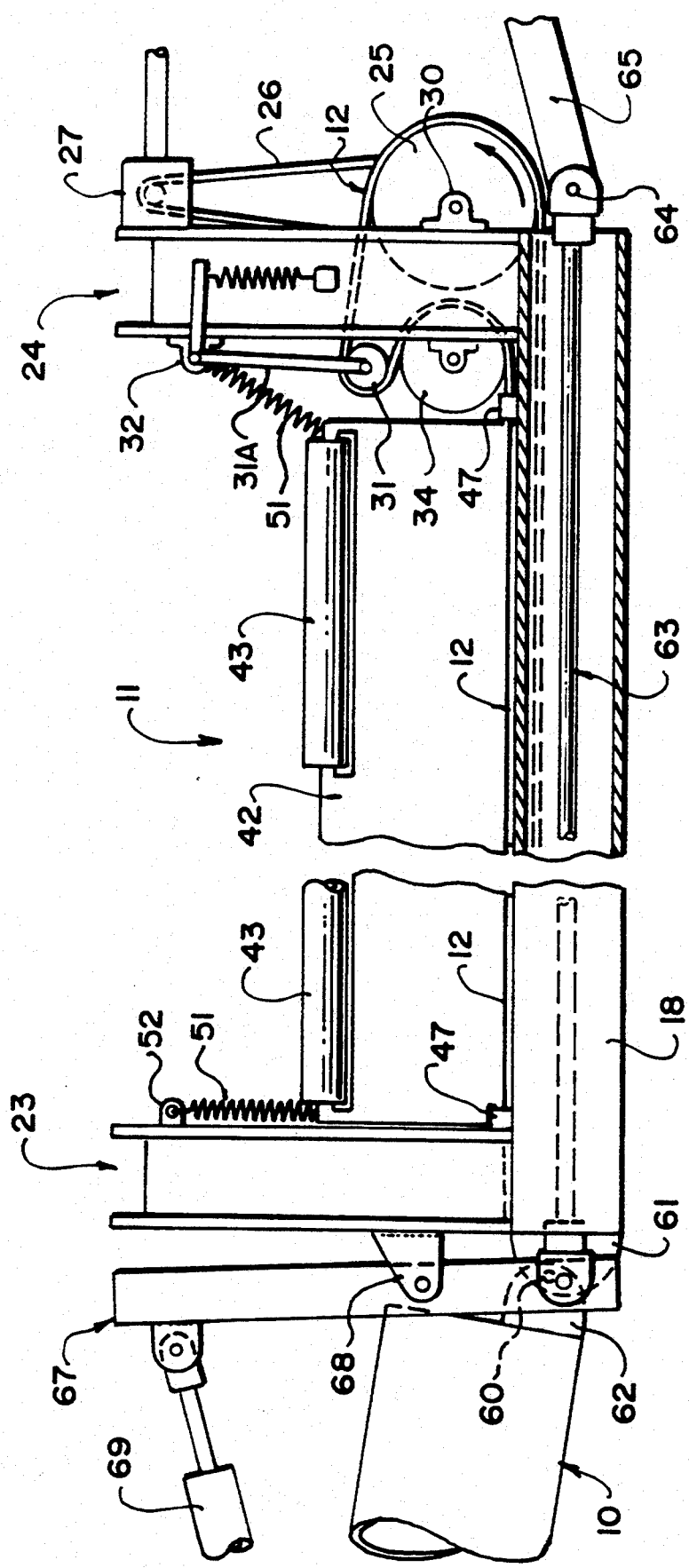
FIG. 3 is a cross sectional view along the lines 3—3 of FIG. 2.

At each end of the base member is provided a tower section 23, 24 each of which is formed from channel members with the open face of the channel facing outwardly and upwardly thus defining a pair of posts in the horizontal transverse rail. The tower section 24 as best shown in FIG. 3 carries a drive roller 25 for the belt driven by a drive belt 26 from a gear box 27 which receives power from the PTO shaft 28 of a tractor 29. The roller 25 is mounted on bearings 30 carried on the rear face of the channel member defining the tower 24. From the drive roller 25, belt 12 passes over an idler roller 31 carried on a bell 31A crank mounted in bearings 32 on the front face of the channel member. The bell crank is biased by a spring 33 so as to pull the idler roller 30 in a clockwise direction about the axis of the bearings 32. From the idler roller the belt passes round a guide roller 34 having its lower most edge aligned with the top surface 13 of the belt 12 to guide the belt in the flat horizontal direction as shown in FIG. 2.

In order to confine the material on the belt in the hopper section there are provided two hopper side walls 40 and 41. Each side wall is formed of a flat plate 42 of sheet metal which carries at its upper edge a pair of rollers 43. Each roller is mounted for rotational about a longitudinal axis of the top edge of the plate 42, the roller being mounted on rod portions 44 extending into the ends of the roller.

The lower end of each plate 42 is welded to a longitudinal rod 46 which projects outwardly beyond each end of the plate and is received in a sleeve 47 mounted on a support rail 48 welded to the inside face of the tube 17 and extending across the top of the plate 19. Thus the rod 46 and the plate 42 carried thereby can rotate about a longitudinal axis along the bottom edge of the plate, that axis being defined by the sleeves 47. At each end, each plate has a lug 50 which receives a spring 51 extending upwardly from the plate to a suitable lug 52 on the top rail of the tower. These springs act to bias the plates into a raised position shown in FIG. 2 in which the plates are inclined upwardly and outwardly to define a V section into which material can be deposited for falling onto the exposed portion of the belt 13.

On the inside surface of the plate 42 is provided a rubber covering layer 54 and that rubber layer extends around the underside of the rod 46 and outwardly from the rod 46 across toward the outside edge of the belt. The cooperation between the layer 54 and the upper surface of the belt thus prevents material from squeezing outwardly beyond the edges of the belt. The rod 46 thus is spaced inwardly from the edge of the belt and spaced above the upper surface of the plate 19 by a sufficient distance to provide a running clearance for the belt 13 on the underside of the portion 54A of the layer 54.

It will be apparent that the plate 42 is thus pivotal about the axis of the rod 46 both in a clockwise and a counterclockwise direction. Upon a vehicle approaching the hopper section from one direction or the other, the adjacent plate 42 is impacted at its upper end by the wheel of the vehicle which hits against the roller 43. The roller can thus rotate and prevents the tire from grasping the edge of the plate and crumpling it under the tire. Instead the plate is simply folded downwardly away from the movement of the tire until the plate lies flat against the base member. Thus when a vehicle approaches from the left as shown in FIG. 2, the vehicle engages firstly the plate on the left hand side and pushes that forwardly and over the belt until it engages the other plate and both are then pushed downwardly to a flat position extending over the right hand tube. In its position the vehicle can safely drive over the hopper section without damage. The plates then lift up to the position shown in FIG. 2. Similarly the device operates also in the opposed direction.

The tubes 18 at the left hand end as shown in FIG. 3 are attached to a horizontal pin 60 by a pair of lugs 61. The horizontal pin 60 is attached to a pair of lugs 62 attached to the lower end of the tube 10. This allows the tube 10 to pivot relative to the base member. A rod 63 extends through each of the tubes 17, 18 and is attached at its forward end to a transverse pin 64 in turn coupled to a hitch arm 65 attached to a hitch 66 of the tractor. The opposed end of the rod projects outwardly from the respective end of the tube and is pivotally connected to a substantially vertical lever 67. The lever 67 is in turn pivotally connected to a lug 68 projecting from the adjacent face of the tower 23. The upper end of the level 67 is attached to a hydraulic cylinder 69 extending from the lever to an adjacent lug 70 on top of the tube 10.

In normal operation of the conveyor, the hopper section sits flat on the floor and the tube 10 is adjusted to its required angle by operation of the assembly 15, pivotal action between the tube 10 and the base member being effected by the pin 60. At this time the rod 63 is relatively loose within the respective tube so there is a possibility of slight side to side sliding movement. However an operation of the cylinder 69 in an expansion direction, the lever 67 is forced in a clockwise direction to pivot about the lug 68 thus pulling on the adjacent end of the rod 63. This tightens on the hitch arm 65 and pulls the hitch arm to a position in a straight line from the end of the rod 63. This lifts the right hand end of the base member. Further movement of the lever 67 in a clockwise direction causes the lever to engage adjacent surface of the tower 23 thus pushing the left hand of the base member upwardly. In the transport position, therefore, the operation of the cylinder 69 lifts the base member so that it is aligned with the length of the tube 10.

The arrangement thus shown and described provides a simple hopper section which can receive material deposited from a truck between the side walls and the belt to be transported into the tube 1 0. Instead of requiring the truck to be backed up to the hopper section, the truck can simply drive over the hopper section and then stop in the required position.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A conveyor for particulate material comprising a conveyor duct, a hopper section and a feed end of the duct, a continuous belt movable longitudinally of the duct and the hopper so as to transport the particulate material deposited in the hopper section into and along the duct, the hopper section having a pair of side walls for confining material on the belt, each side wall being arranged adjacent a respective side edge of the belt, the side walls each being mounted for pivotal movement about a longitudinal axis at a base of the respective side wall such that each side wall can fold flat downwardly to allow passage over the side wall and the hopper section of a vehicle wheel, and means biasing the side walls into a raised position for confining a material on the belt.

2. The conveyor according to claim 1 wherein the hopper section includes a base member extending longitudinally of the belt, the side walls extending along the length of the base member, the base member having a length sufficient to receive the width of a road vehicle.

3. The conveyor according to claim 2 wherein the base member includes a tower portion at each end standing upwardly from the base member and bridging the belt.

4. The conveyor according to claim 3 including drive rollers for driving the belt mounted in the tower section at an opposed end of the base member from the duct.

5. The conveyor according to claim 2 wherein the base member is pivotally coupled to the duct.

6. The conveyor according to claim 5 including a hitch member at an end of the base member remote from the duct for connection to a tractor.

7. The conveyor according to claim 6 including hydraulic cylinder drive means for lifting the base member from the ground for transportation with the duct towed by the tractor.

8. The conveyor according to claim 7 wherein the hopper section includes a first and a second tower member each arranged at a respective end of the base member and extending upwardly therefrom and bridging the belt, the hydraulic cylinder drive means acting on a lever pulling on a rod to pull the hitch member upwardly and subsequently acting upon the tower member adjacent the conveyor duct to lift the hopper section upwardly.

9. The conveyor according to claim 1 wherein each side wall has a roller member mounted at a top of the side wall and rotatable about an axis longitudinal of the side wall for engaging the vehicle wheel.

10. The conveyor according to claim 1 wherein each side wall can pivot from the raised position in both directions to allow folding downwardly to either side of the belt to accommodate movement of the vehicle wheel in one direction or the opposed direction.

11. The conveyor according to claim 1 wherein each side wall includes a flexible sheet thereover which is turned under a lowermost edge of the side wall for engaging an upper surface of the flat belt.

* * * * *